United States Patent [19]
Oikawa et al.

[11] Patent Number: 5,783,794
[45] Date of Patent: Jul. 21, 1998

[54] METHOD AND MATERIAL FOR RESISTANCE WELDING STEEL-BASE METAL SHEET TO ALUMINUM-BASE METAL SHEET

[75] Inventors: Hatsuhiko Oikawa; Yasuo Takahashi; Tohru Saito, all of Futtsu; Yutaka Okuda; Kazuo Narita, both of Nagoya; Fuminori Matsuda; Katsutoshi Ueno, both of Toyota; Goro Watanabe, Aichi-gun, all of Japan

[73] Assignees: Nippon Steel Corporation, Tokyo; Toyota Jidosha Kabushiki Kaisha, Toyota, both of Japan

[21] Appl. No.: 908,128

[22] Filed: Aug. 11, 1997

Related U.S. Application Data

[63] Continuation of Ser. No. 491,940, filed as PCT/JP94/01933, Nov. 15, 1994 published as WO95/13898, May 26, 1995, abandoned.

[30] Foreign Application Priority Data

Nov. 15, 1993 [JP] Japan ............................ 5-307036
Apr. 12, 1994 [JP] Japan ............................ 6-073468

[51] Int. Cl.$^6$ ............................ B23K 11/14; B23K 11/20
[52] U.S. Cl. ............................ 219/118; 219/93; 219/94
[58] Field of Search ............................ 219/93, 118, 91.2, 219/117.1, 94

[56] References Cited

U.S. PATENT DOCUMENTS

| | | | |
|---|---|---|---|
| 4,495,397 | 1/1985 | Opprecht et al. | 219/93 |
| 4,591,687 | 5/1986 | Urech | 219/93 |
| 5,075,531 | 12/1991 | Sofue et al. | 219/118 |
| 5,302,797 | 4/1994 | Yasuyama et al. | 219/118 |

FOREIGN PATENT DOCUMENTS

| | | | |
|---|---|---|---|
| 908962 | 9/1972 | Canada | 219/118 |
| A-2162317 | 7/1973 | European Pat. Off. . | |
| C-740695 | 5/1943 | Germany . | |
| 2433648 | 1/1975 | Germany | 219/118 |
| 4-55066 | 2/1992 | Japan . | |
| 4-127973 | 4/1992 | Japan . | |
| 4-253578 | 9/1992 | Japan . | |
| 5-111778 | 5/1993 | Japan . | |
| 5-263875 | 10/1993 | Japan . | |

OTHER PUBLICATIONS

Welding International, vol. 7, No. 10, Jan. 1, 1993, pp. 820–827, XP 000397738, H. Oikawa, et al., "New Resistance Welding Techniques for Steel and Aluminum", p. 823, right col., line 9 –p. 826, left col., line 21.
Patent Abstracts of Japan, vol. 016, No. 299 (M–1274), Jul. 2, 1992 & JP-A-04 081288 (Kobe Steel Ltd), Mar. 13, 1992.

*Primary Examiner*—Teresa J. Walberg
*Assistant Examiner*—J. Pelham
*Attorney, Agent, or Firm*—Kenyon & Kenyon

[57] ABSTRACT

The present invention relates to a resistance welding method suitable for use in spot welding between a steel-base metal sheet, which has been plated for rust prevention purposes, and an aluminum-base metal sheet and aims to permit a current to flow at a high density across the plated steel sheet and the aluminum-clad steel sheet, thereby realizing high-quality welding.

An aluminum-clad steel sheet comprised of a steel layer having projections and an aluminum layer is interposed between the plated steel sheet and the aluminum-base metal sheet to be welded to each other. An electrode is energized by a predetermined weld current from an alternating power supply. The current path is limited to the area of the projections, and metallic melt formed by melting of the plating is accommodated between the projections, preventing the current-carrying area from being increased. Consequently, the temperature of the interface of the plated steel sheet and the aluminum-clad steel sheet can be efficiently raised, resulting in the formation of a proper nugget on both sides of the aluminum-clad steel sheet.

5 Claims, 9 Drawing Sheets

METHOD AND MATERIAL FOR RESISTANCE WELDING STEEL-BASE METAL SHEET TO ALUMINUM-BASE METAL SHEET

This application is a continuation of application Ser. No. 08/491,940, filed as PCT/JP94/01933, Nov. 15, 1994, published as WO95/13898, May 26, 1995, now abandoned.

TECHNICAL FIELD

The present invention relates to a method for resistance welding dissimilar metal sheets such as steel-base metal sheets and aluminum-base metal sheets, which are used in assembling automobiles, railway vehicles, ships, building structures, etc., and a material used for said method, and more particularly to a method for resistance welding a steel-base metal sheet to an aluminum-base metal sheet, which method is suitable for spot welding between a steel-base metal sheet, which has been subjected to rust preventive treatment by plating, and an aluminum-base metal sheet, and an aluminum-clad steel sheet suitable for said method.

BACKGROUND ART

It is known that resistance welding between dissimilar metals, such as between a steel and aluminum, often creates an intermetallic compound as a result of alloying between the dissimilar metals and that the formation of the intermetallic compound results in deteriorated mechanical properties because the intermetallic compound is brittle. In particular, for a combination of a steel-base metal and an aluminum-base metal, an intermetallic compound is likely to be formed and, further, the electrical and thermal properties thereof impose large restrictions on current conditions, making it very difficult to realize sound welding.

In recent years, many demands have been generated for a joint between dissimilar metals. For example, in spot welding and other types of welding for automobile bodies, there is a demand for a technique capable of realizing resistance welding between a steel-base metal sheet, which has been plated for rust prevention purposes (hereinafter referred to as "plated steel sheet"), and an aluminum-base metal sheet.

This resistance welding is the same as the conventional resistance welding disclosed in the prior art documents and the like in that base metals to be welded are a steel sheet and an aluminum sheet. Therefore, a method is considered wherein an aluminum-clad steel sheet is inserted between the plated steel sheet and the aluminum-base metal sheet and, in this state, resistance welding is carried out.

However, a temperature rise, at the interface between the plated steel sheet and the steel side of the aluminum-clad steel sheet, caused by heat derived from electrical resistance, results in the formation of plating prior to the growth of a nugget on the steel side and the aluminum side of the aluminum-clad steel sheet, which in turn leads to melting of the plating metal. Consequently, a melted plating metal is interposed between the plated steel sheet and the steel of the aluminum-steel sheet, increasing the current-carrying area. In this area, the current is dispersed, lowering the current density.

For this reason, in order to form a nugget which can ensure satisfactory strength, a large amount of current should be made to flow. The large flow of current causes plating on electrodes or deposition of aluminum and scattering (expulsion) of melted aluminum. Therefore, the current value cannot be increased, rendering the possible range of proper welding conditions very narrow.

In this field, for example, Japanese Unexamined Patent Publication (Kokai) No. 5-111778 discloses a method wherein a non-aluminum/aluminum-clad sheet having a two-layer structure of a non-aluminum metal sheet and an aluminum-base metal sheet, having specified sheet thickness and sheet thickness ratio (sheet thickness not more than 2.0 mm for all the non-aluminum metal sheet, aluminum-base metal sheet, and clad sheet; non-aluminum metal sheet:aluminum-base metal sheet thickness ratio=4:1 to 1:7), is inserted between a non-aluminum metal sheet and an aluminum-base metal sheet, and spot welding is carried out under current conditions derived by a particular expression.

Japanese Unexamined Patent Publications (Kokai) No. 4-55066, No. 4-127973, and No. 4-253578 disclose spot welding between a steel-base metal sheet and an aluminum-base metal sheet using an aluminum-clad steel sheet as an insert material. These conventional methods, however, suffer from problems such as the necessity of two-step energizations and the necessity of heavy currents. In these methods, no consideration is given to a method for ensuring high joint strength in a wide range of current values and a method for spot welding between a plated steel sheet and an aluminum-base metal sheet. Further, in this method for joining dissimilar metals, modification of the electrode shape and the use of a projection are not taken into consideration.

For example, spot welding using an aluminum-clad steel sheet having an aluminum-base metal sheet steel-base metal sheet thickness ratio of 1:1.3 to 1:5.0 is already known in the art. However, a method for preventing a lowering in fatigue strength of a joint is not known in the art. Furthermore, a method for ensuring high joint strength for a wide range of current values while minimizing the deposition of aluminum or plating on electrodes is not also known in the art.

The conventional method for spot welding a steel-base metal sheet to an aluminum-base metal sheet using an aluminum-clad steel sheet as an insert material involves a troublesome step of changing the direction of current flow in a two-step energization. Further, according to the conventional welding method, for example, in the case of a plated steel sheet, the plating on the plated steel sheet side hinders the formation of a nugget in a welding current range from about 8 to 11 kA, a high current. In order to increase the weld strength, the welding current may be increased. The increase in current value, however, poses problems including deposition of aluminum on the electrode on the aluminum-base metal sheet side and deposition of plating on the electrode on the plated steel sheet side to cause welding between the sheet and the electrode, shortened electrode tip life, and unstable current flow to cause variations in strength, resulting in lowered strength.

As described above, in spot welding between a steel sheet or a plated steel sheet and an aluminum-base metal sheet using an aluminum-clad steel sheet as an insert material, no method has been developed which can ensure high joint strength over a wide range of current values, minimize the deposition of aluminum or plating on the electrode, and minimize the lowering in fatigue strength of the joint. Especially, in the welding wherein a plated steel sheet is used as a counter material, effective generation of heat on the plated steel sheet side is important. The conventional methods do not take this into consideration at all.

DISCLOSURE OF INVENTION

An object of the present invention is to provide a method for resistance welding dissimilar metals, which method enables high joint strength to be ensured over a wide range of current values, minimizes the deposition of aluminum or plating on the electrode, and minimizes the lowering in fatigue strength of the joint.

Another object of the present invention is to ensure a high current density in an early stage of the energization by reducing the area of abutment between the plated steel sheet and the aluminum-clad steel sheet in resistance welding with an aluminum-clad steel sheet interposed between the plated steel sheet and the aluminum-base metal sheet and thereby to provide a method for resistance welding a plated steel sheet to an aluminum-base metal sheet and a material for the resistance welding which can solve the above problems.

The subject matter of the present invention which can attain the above object is as follows.

(1) A method for resistance welding a plated steel sheet to an aluminum-base metal sheet, comprising the steps of: inserting an aluminum-clad steel sheet comprising a laminate of a steel-base metal sheet and an aluminum-base metal sheet between a plated steel sheet and an aluminum-base metal sheet so that the same types of metals face each other; and subjecting the resultant assembly to resistance welding, characterized in that irregularities are formed on at least one of the plated steel sheets on the surface to be abutted against the aluminum-clad steel sheet and the aluminum-clad steel sheet on the surface to be abutted against the plated steel sheet, thereby reducing the current-carrying area.

(2) A method for resistance welding a plated steel sheet to an aluminum-base metal sheet, comprising the steps of: inserting an aluminum-clad steel sheet comprising a laminate of a steel-base metal sheet and an aluminum-base metal sheet between a plated steel sheet and an aluminum-base metal sheet so that the same types of metals face each other; and subjecting the resultant assembly to resistance welding, characterized in that a steel-base metal sheet having an opening is interposed between the plated steel sheet and the aluminum-clad steel sheet to reduce the current-carrying area.

(3) A method for resistance welding the dissimilar metals of a steel-base metal sheet or a plated steel sheet and an aluminum-base metal sheet, comprising the steps of: inserting a 0.2 to 1.2 mm-thick aluminum-clad steel sheet of a steel-base metal sheet and an aluminum-base metal sheet between a steel-base metal sheet or a plated steel sheet and an aluminum-base metal sheet so that the same types of metals face each other; and spot-welding the steel-base metal sheet or plated steel sheet to the aluminum-base metal sheet by a single energization, characterized in that the steel-base metal sheet or plated steel sheet has a projection with a diameter of 2.0 to 5.0 mm and a height of 0.6 to 1.5 mm and the welding is carried out under conditions of a weld current of 7.5 to 15.5 kA and a weld time of 80 to 280 ms.

(4) A method for resistance welding a steel-base metal sheet or a plated steel sheet to an aluminum-base metal sheet according to claim 3, characterized in that an R-type electrode or an F-type electrode of not less than 80 mm radius of curvature of the front end is disposed on the side of the aluminum-base metal sheet and the welding is carried out under the conditions of a weld current of 7.5 to 15.5 kA and a weld time of 80 to 280 ms.

(5) A resistance welding material constituting an aluminum-clad steel sheet comprised of a steel-base metal sheet and an aluminum-base metal sheet, which aluminum-clad steel sheet, when a plated steel sheet and an aluminum-base metal sheet are welded to each other under conditions of a weld current of 7.5 to 15.5 kA and a weld time of 80 to 280 ms, is inserted between the plated steel sheet and the aluminum-base metal sheet so that the same types of metals face each other, characterized in that the aluminum-clad steel sheet has a thickness ratio of the aluminum-base metal sheet to the steel-base metal sheet in the range of from 1:1.3 to 1:5.0 and has a thickness of 0.2 to 1.2 mm and, provided on the surface of the steel-base metal sheet side thereof, irregularities having a predetermined percentage area.

(6) A resistance welding material, constituting a steel-base metal sheet or a plated steel sheet, for use in a welding process which comprises the steps of: inserting a 0.2 to 1.2 mm-thick aluminum-clad steel sheet of a steel-base metal sheet and an aluminum-base metal sheet between a steel-base metal sheet or a plated steel sheet and an aluminum-base metal sheet so that the same types of metals to face each other; and spot-welding the steel-base metal sheet or plated steel sheet to the aluminum-base metal sheet by a single energization under conditions of a weld current of 7.5 to 15.5 kA and a weld time of 80 to 280 ms, characterized in that the steel-base metal sheet or plated steel sheet has projections with a diameter of 2.0 to 5.0 mm and a height of 0.6 to 5.0 mm.

(7) The resistance welding material according to the item (5), wherein the protrusions have a percentage area of 10 to 90% and a height of 0.02 to 1.0 mm.

(8) The resistance welding material according to the item (5), wherein the protrusions are in the form of a circular cylinder, a triangular prism, or a prism and are provided at a pitch of not more than 3 mm.

(9) The resistance welding material according to the item (5), wherein the protrusions are formed by compression molding, machining, etching, or laser beam machining.

(10) A method for resistance welding the dissimilar metals of a plated steel sheet and an aluminum-base metal sheet, comprising the steps of: inserting a 0.2 to 1.2 mm thick aluminum-clad steel sheet of a steel-base metal sheet and an aluminum-base metal sheet between a plated steel sheet and an aluminum-base metal sheet so that the same types of metals face each other; and spot-welding the plated steel sheet to the aluminum-base metal sheet by single energization, characterized in that the aluminum-clad steel sheet has a sheet thickness ratio of the aluminum-base metal sheet to the steel-base metal sheet in the range of from 1:1.3 to 1:5.0 and the welding is carried out under conditions of a weld current of 7.5 to 15.5 kA and a weld time of 80 to 280 ms.

(11) A method for resistance welding the dissimilar metals of a steel-base metal sheet or a plated steel sheet and an aluminum-base metal sheet, comprising the steps of: inserting a 0.2 to 1.2 mm-thick aluminum-clad steel sheet of a steel-base metal sheet and an aluminum-base metal sheet between a steel-base metal sheet or a plated steel sheet and an aluminum-base metal sheet so that the same types of metals face each other; and spot-welding the steel-base metal sheet or plated steel sheet to the aluminum-base metal sheet by a single energization, characterized in that a CF-type or P-type electrode of 2.0 to 5.0 mm in contact area diameter of front end is disposed on the side of the steel-base metal sheet or plated steel sheet with an R-type electrode or an F-type electrode of not less than 80 mm in radius of curvature of front end being disposed on the side of the aluminum-base metal sheet and the welding is carried out under conditions of a weld current of 7.5 to 15.5 kA and a weld time of 80 to 280 ms.

(12) A resistance welding material constituting an aluminum-clad steel sheet comprised of a steel-base metal sheet and an aluminum-base metal sheet, which aluminum-clad steel sheet, when a plated steel sheet and an aluminum-base metal sheet are welded to each other under conditions of a weld current of 7.5 to 15.5 kA and a weld time of 80 to 280 ms, is inserted so that the same types of metals to face each other, characterized in that the aluminum-clad steel sheet has a thickness ratio of the aluminum-base metal sheet to the steel-base metal sheet in the range of from 1:1.3 to 1:5.0 and has a thickness of 0.2 to 1.2 mm.

BEST MODE FOR CARRYING OUT THE INVENTION

Figure 1:
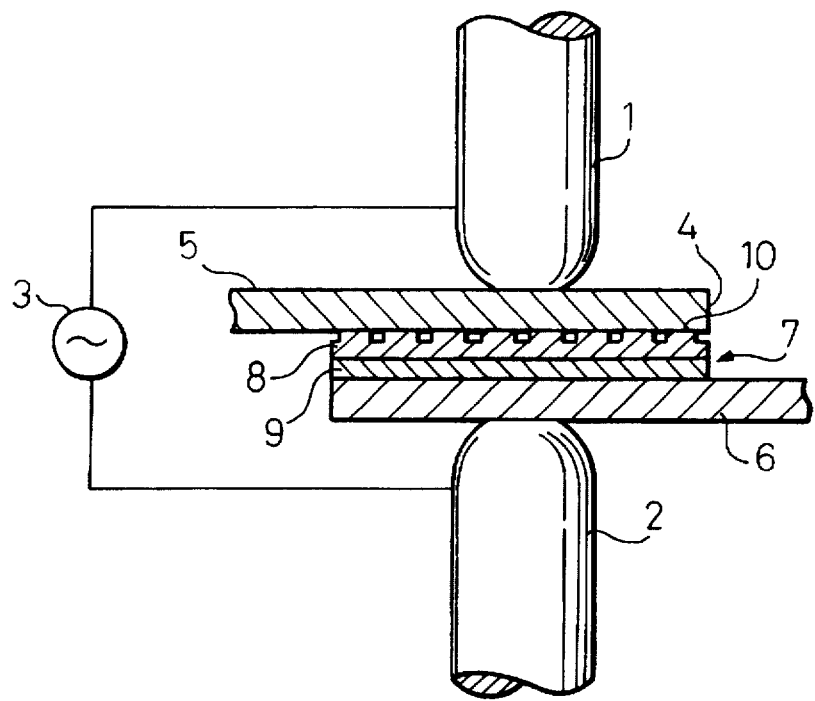
FIG. 1 is a conceptual view illustrating a resistance welding method of Example 1 of the present invention.

A technical feature of the present invention is that, by virtue of a reduced area of abutment between a plated steel sheet and an aluminum-clad steel sheet, a high current density can be ensured in an early stage of energization when a current flows across a plated steel sheet and an aluminum-base metal sheet. Therefore, the temperature of the interface of the plated steel sheet and the aluminum-clad steel sheet can be efficiently raised, permitting a proper weld nugget to be formed on both sides of the aluminum-clad steel sheet.

In an embodiment where irregularities are provided on the abutment area of one of the plated steel sheet and the aluminum-clad steel sheet to reduce the current-carrying area, if the plating metal on the surface of the plated steel sheet is melted, the melted plating is accommodated into the recessed portion, which prevents an increase in current-carrying area caused by melted plating.

In an embodiment where a steel-base metal sheet having an opening is interposed between the plated steel sheet and the aluminum-clad steel sheet to reduce the current-carrying area, the current-carrying area can be reduced without any special working of the plated steel sheet and aluminum-clad steel sheet per se.

In an embodiment where an aluminum-clad steel sheet with irregularities, having a predetermined percentage area, formed on the surface of the steel-base metal is interposed between the plated steel sheet and the aluminum-base metal sheet, a proper current-carrying area is always ensured between the plated steel sheet and the aluminum-clad steel sheet, regardless of the site where the resistance welding is to be carried out.

In an embodiment where an aluminum-clad steel sheet is inserted between the plated steel sheet and the aluminum-base metal sheet and, in this state, resistance welding is carried out, the sheet thickness ratio of the aluminum-clad steel sheet is important in order to effectively generate heat on the plated sheet side.

According to the present invention, in spot welding a plated steel sheet to an aluminum-base metal sheet, an aluminum-clad steel sheet having a high steel-base metal sheet thickness ratio (aluminum-base metal sheet:steel-base metal sheet=1:1.3 to 1:5.0) is used as an insert material to enhance the amount of heat generated on the plated steel sheet side at the time of energization.

The reason for this is that, since the electrical resistance of the steel-base metal sheet is higher than that of the aluminum-base metal sheet, the amount of heat generated is increased by increasing the sheet thickness ratio of the steel-base metal sheet. In this case, according to the present invention, the sheet thickness ratio of the aluminum-clad steel sheet is limited to aluminum-base metal sheet:steel-base metal sheet=1:1.3 to 1:5.0 because when the sheet thickness ratio of the steel-base metal sheet is lower than the above range, the above effect attained by the generation of heat on the steel-base metal sheet side becomes smaller.

The heat generated at that time is also transmitted to the aluminum-base metal side of the aluminum-clad steel sheet. If the sheet thickness ratio of the aluminum-base metal layer is higher than the above range, the cooling effect is increased and the heat generation effect on the steel-base metal sheet side is reduced, resulting in lowered joint strength. On the other hand, if the sheet thickness ratio of the steel-base metal sheet is higher than the above range, problems, including that of surface flash or expulsion, are likely to occur on the aluminum-base metal sheet side and the weight reduction effect of the sheet per se is reduced.

In spot welding between a steel sheet or a plated steel sheet and an aluminum-base sheet using an insert material, a CF-type or P-type electrode, 2.0 to 5.0 mm in diameter at the front end, is disposed on the steel-base metal sheet side or the plated steel sheet side.

Alternatively, a steel-base metal sheet or plated steel sheet with a projection having a diameter of 2.0 to 5.0 mm and a height of 0.6 to 5.0 mm may be used to focus the current flow on the steel-base metal sheet side or plated steel sheet side at the time of energization, thereby enhancing the amount of heat generated. This enables the formation and growth of a nugget on the steel-base metal sheet side or plated steel sheet side to be promoted in a low current region (7.5 to 11.0 kA).

The heat generated at that time has an effect on the aluminum-base metal sheet side by heat conduction and, consequently, the formation and growth of a nugget on the aluminum side is promoted, improving the weld strength. Since failure in a tensile test occurs on the aluminum-base metal sheet side, the growth of the nugget on the aluminum side contributes to an improvement in joint strength.

For this reason, high strength can be provided even in a low current region, enabling high joint strength to be ensured over a wide range of current values. An increase in weld current increases the amount of aluminum deposited on an electrode on the aluminum-base metal sheet side or the amount of plating deposited on an electrode on the plated steel sheet side, posing problems such as unstable current flow, varied joint strength, and poor continuous spotting.

By contrast, according to the resistance welding method of the present invention, since high joint strength can be provided in a relatively low current region (7.5 to 13.0 kA), it becomes possible to carry out welding in such a current region as will cause no significant deposition of aluminum or plating and, at the same time, to provide high joint strength. Further, since the amount of aluminum or plating deposited is small, improved continuous spotting can be realized.

Even when a plated steel sheet is used, it usually becomes difficult to form a nugget on the plated steel sheet side when use is made of an aluminum-clad steel sheet having aluminum-base metal sheet : steel-base metal sheet thickness ratio=1:less than 1.3, necessitating a high weld current. According to the method of the present invention, welding in a low current region is possible, enabling the deposition of aluminum or plating on electrodes to be minimized. Further, in an embodiment where an aluminum-clad steel sheet is used which has an aluminum-base metal sheet to steel-base metal sheet thickness ratio of 1:1.3 to 1:5.0 and a thickness of 0.2 to 1.2 mm, or an embodiment where a steel-base metal sheet or plated steel sheet with a projection formed thereon is used, the use of an R-type or an F-type electrode of not less than 80 mm in radius of curvature of the curved face at the front end on the aluminum-base metal sheet side results in dispersion of the current flow, preventing surface flash or expulsion or the deformation of the aluminum-base metal sheet caused by excessive generation of heat. This ensures high joint strength.

The reason, in the resistance welding method and the material for resistance welding according to the present invention, why the thickness of the aluminum-clad steel sheet is limited to 0.2 to 1.2 mm is that if the sheet thickness is smaller than the above range, no nugget having satisfactory size can be formed, resulting in no improvement in strength or the formation of an intermetallic compound due to excessive heat input.

On the other hand, when the sheet thickness is larger than the above range, the presence of the aluminum-clad steel sheet causes a difference in level between the steel-base metal sheet and the aluminum-base metal sheet to be welded, causing problems such as limitation of usable site, necessity of high current for providing high joint strength, or remarkably lowered fatigue strength of the joint.

The problem of the lowered fatigue strength is important, and in order to avoid lowering the fatigue strength, the thickness of the aluminum-clad steel sheet is preferably as small as possible. However, a certain thickness is necessary for sufficiently ensuring the amount of heat generated and for satisfactorily growing the nugget. The reason why the fatigue strength folls with increased thickness of the aluminum-clad steel sheet is thought to be as follows. Since the joint has a three-ply structure using an aluminum-clad steel sheet, the eccentricity of the load becomes large. This causes a bending moment acting on the vicinity of the nugget to become larger than that in the case of a two-ply structure, so that the stress increases with increasing the thickness of the insert material.

In order to improve the fatigue strength, the thickness of the aluminum-clad steel sheet is preferably as small as possible. However, when it is excessively small, the above effect attained by the generation of heat at the time of welding is deteriorated. For this reason, the thickness of the aluminum-clad steel sheet is considered to be desirably 1.2 mm or less, which causes no fatigue strength problem in practical use, preferably 0.4 to 1.0 mm.

The weld current is limited to 7.5 to 15.5 kA because, when it is lower than the above range, the joint strength is lowered, while when it exceeds the above range, surface splash or expulsion is likely to occur, or the amount of aluminum or plating on the electrode is increased.

The weld time is limited to 80 to 280 ms. When it is less than the above range, the growth of a nugget is unsatisfactory, resulting in lowered strength. On the other hand, when it exceeds the above range, the improvement in strength is saturated. In practical use, the weld time is preferably 140 to 240 ms from the viewpoint of providing stable strength. The welding load may be determined according to the sheet thickness and 2.45 t kN (wherein t represents the smallest sheet thickness among the thicknesses of the steel-base metal sheet, plated steel sheet, aluminum-clad steel sheet, and aluminum-base metal sheet) (for example, about 1.47 to 3.43 kN). When the welding load is outside the above range, for example, when welding load is lower than the above range, the weld current flow becomes unstable, while, when it is higher than the above range, unfavorable phenomena occurs such as lowering in contact resistance to cause a reduced amount of heat generated or increase in deformation of a sheet, particularly an aluminum-base metal sheet, by contact with an electrode to cause a lowering in strength. For this reason, it is preferred to select the welding load according to the above criteria.

In the resistance welding method of the present invention, the diameter of the contact face at the front end of the CF-type or P-type electrode on the steel-base metal sheet side or plated steel sheet side is limited to 2.0 to 5.0 mm. The reason for this is as follows. When it is less than the above range, unfavorable phenomena occur such as unstable current flow, welding of the electrode to the sheet by excessive generation of heat, and formation of an impression having an excessive depth by the electrode. On the other hand, when it is larger than the above range, the effect of improving the current density is deteriorated.

In the resistance welding method of the present invention, the radius of curvature of the curved face at the front end of the R-type electrode on the aluminum-base metal sheet side is limited to not less than 80 mm because, when it is less than the above value, the effect of lowering the current density and thereby preventing the occurrence of surface splash or expulsion is lowered.

In the resistance welding method and the material for resistance welding according to the present invention, the size of the projection is limited to 2.0 to 5.0 mm in diameter and 0.6 to 5.0 mm in height. When it is smaller than the above range, unfavorable phenomena occur including that the current flow becomes unstable, the projection is collapsed, or the contact of the projection alone becomes difficult. On the other hand, when it is larger than the above range, the effect of improving the current density becomes small.

In the case of projection welding, the welding load may be properly selected in the range of about 0.68 to 4.41 kN according to the size of the projection.

The thickness of the steel-base metal sheet, plated steel sheet, and aluminum-base metal sheet used in the present invention is preferably in the range of 0.5 to 2.0 mm from the viewpoint of maintaining high joint strength through effective utilization of the heat generation effect. The plating provided on the steel-base metal may be any plating (such as Zn, Zn—Fe, Zn—Al, or Zn—Ni) so far as it is conductive. The coverage (on double side basis) is preferably not more than 100/100 g/m². Further, the aluminum-clad steel sheet used in the welding method according to the present invention may be produced by any method so far as it is a metallurgical method, such as rolling, explosive cladding, HIP, or diffusion joining.

The present invention will now be described in more detail with reference to the following examples.

EXAMPLES

Example 1

FIG. 1 is a conceptual diagram illustrating a method for carrying out resistance welding between a steel sheet and an aluminum-base metallic sheet.

As shown in the drawing, an alternating-current power supply 3 is connected to electrodes 1 and 2. The alternating-current power supply 3 serves to supply the electrodes 1 and 2 with an alternating-current voltage of a predetermined period and a predetermined voltage for a predetermined duration under preset conditions.

Both the electrodes 1 and 2 are dome radius type (DR type) electrodes of 6 mm in diameter and 40 mm in radius at the front face and displace together, with a not shown arm to create a predetermined load between both the electrodes.

A welding member 4 abutted against the electrode 1 is a rust-prevention plated steel sheet 4 having on its both sides a plating 5 provided by galvanizing. On the other hand, the welding member 6 abutted against the electrode 2 is an aluminum sheet 6 formed of an aluminum-base metal.

An aluminum-clad steel sheet 7 comprising a laminate of a steel layer 8 and an aluminum layer 9 is interposed between the plated steel sheet 4 and the aluminum sheet 6. The steel layer 8 and the aluminum layer 9 are laminated on top of the other by a solid phase joint such as pressure welding.

Figure 2A:
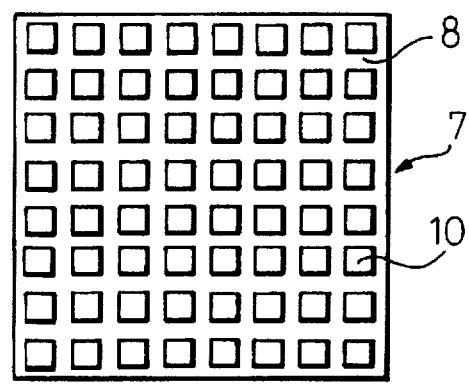
FIG. 2(A) is a plan view showing a construction of an aluminum-clad steel sheet as a principal part of Example 1.
Figure 2B:
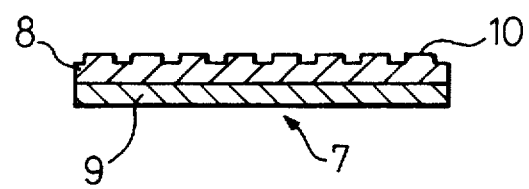
FIG. 2(B) is a cross-sectional view of the aluminum-clad steel sheet shown in FIG. 2(A)

FIG. 2 is a plan view (FIG. 2(A)) and a front sectional view (FIG. 2(B)) of an aluminum-clad steel sheet 7. As can be seen from the drawing, in the aluminum-clad steel sheet 7, the surface of the steel layer 8 has a plurality of protrusions 10 having a predetermined height and a predetermined percentage area at a predetermined pitch.

The resistance welding used in the present example is a welding method in which a predetermined load is applied between metals to be welded and, in this state, an electric current is allowed to flow to generate heat by resistance heating at the interface between the metals, which heat is used as a heat source to form and grow a weld nugget at the interface region.

In this case, the amount of heat generated by the resistance heating is equal to the power consumption across the electrodes 1, 2, and the amount of heat generated per unit volume is proportional to the square of the current density. Therefore, in order to increase the amount of the temperature rise at the welding portion based on an identical power consumption, it is necessary to improve the current density at the time of resistance welding.

On the other hand, in the plated steel sheet 4 having a plating 5 on its surface, the plating melts during the resistance welding, and, as described above, if no measure is taken against the melting of the plating, the weld area is increased, making it difficult to ensure a suitable current density.

Figure 3:
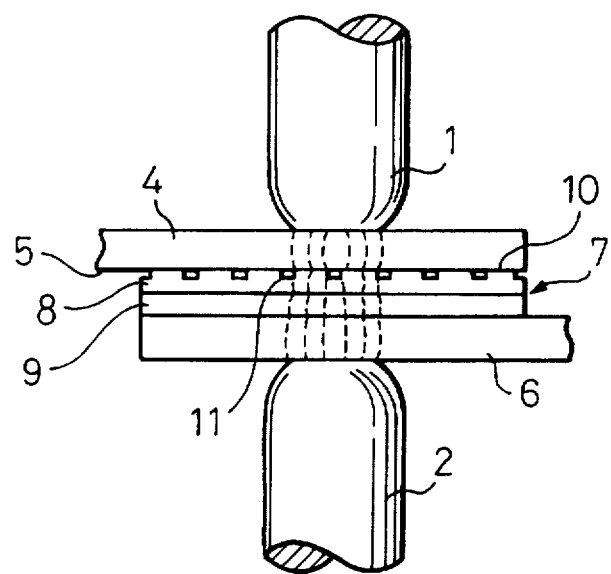
FIG. 3 is a diagram illustrating the effect of the resistance welding method of Example 1.

In the present example, the protrusions 10 are provided in the aluminum-clad steel sheet 7 from the viewpoint of avoiding an adverse effect of the melting of the plating 5 on the welding. Specifically, as shown in FIG. 3, they are provided for forming a small current-carrying area between the plated steel sheet 4 and the aluminum-clad steel sheet 7.

More specifically, in the resistance welding used in the present example, the current carrying area formed by a predetermined flow of current across the materials to be welded, i.e., the plated steel sheet 4, aluminum sheet 6, and the aluminum-clad steel sheet 7, by application of a predetermined alternating voltage across the electrodes 1, 2 is bounded by the area of the protrusion 10 in the aluminum-clad steel sheet 7.

For this reason, the resistance heating caused by the current flow is centralized in the abutted area between the protrusion 10 in the aluminum-clad steel sheet 7 and the plated steel sheet 4. Further, the plating 11 melted by the generated heat deposits on the surface of the aluminum-clad steel sheet 7 except for the protrusion 10. Therefore, there is no possibility that the abutted area between the plated steel sheet 4 and the aluminum-clad steel sheet 7, that is, the current-carrying area, is increased by the melted plating.

Thus, according to the resistance welding used in the present example, even when a plated steel sheet 4 having a plating 5 on its surface is welded, it is possible to stably create a high current density.

The creation of such a high current density enables a suitable weld nugget to be formed in the interface of the aluminum-clad steel sheet 7 (steel layer 8) and the plated steel sheet 4 and in the interface of the aluminum-clad steel sheet 7 (aluminum layer 9) and the plated steel sheet 4.

In the present example, resistance welding was carried out using a steel sheet, both sides of which have been galvanized at a coverage of 60/60 g/m², as the plated steel sheet 4, and A5052 (JIS standards) as the aluminum sheet 6 under conditions of a weld load between the electrodes of 1.96 kN and a weld time of 167 ms (corresponding to 10 cycles in a 60 Hz alternating-current power supply) with the shape of the protrusion 10 and the weld current value varied. The quality of the resultant weld was evaluated in terms of tensile shear strength. The results are given in Tables 1 to 4. The tensile shear strength given in each table is the average of n=2 except for data of Run No. 29 given in Table 4.

TABLE 1

| Run No. | Aluminum-clad steel sheet | | | Steel sheet | Welding current (kA) | Tensile shear strength (kN) (average of n = 2) | Classification |
|---|---|---|---|---|---|---|---|
| | Height of protrusion (mm) | Percentage area (%) | Pitch (mm) | | | | |
| 1 | 0 (No projection) | — | — | No plating | 8 | 1.4 | Comp. Ex. |
| 2 | 0 | — | — | No plating | 11 | 2.8 | |
| 3 | 0 | — | — | No plating | 14 | 3.2 | |
| 4 | 0 (No projection) | — | — | Galvanized | 8 | 0 | |
| 5 | 0 | — | — | Galvanized | 11 | 1.7 | |
| 6 | 0 | — | — | Galvanized | 14 | 3.0 | |

TABLE 2

| Run No. | Aluminum-clad steel sheet | | | Steel sheet | Welding current (kA) | Tensile shear strength (kN) (average of n = 2) | Classification |
|---|---|---|---|---|---|---|---|
| | Height of protrusion (mm) | Percentage area (%) | Pitch (mm) | | | | |
| 7 | 0.04 | 50 | 1.0 | Galvanized | 8 | 0.7 | Ex. of inv. |
| 8 | 0.04 | 50 | 1.0 | Galvanized | 11 | 1.9 | |
| 9 | 0.04 | 50 | 1.0 | Galvanized | 14 | 2.8 | |
| 10 | 0.06 | 50 | 1.0 | Galvanized | 8 | 0.8 | |
| 11 | 0.06 | 50 | 1.0 | Galvanized | 11 | 2.5 | |
| 12 | 0.06 | 50 | 1.0 | Galvanized | 14 | 3.0 | |
| 13 | 0.1 | 50 | 1.0 | Galvanized | 8 | 1.4 | |
| 14 | 0.1 | 50 | 1.0 | Galvanized | 11 | 2.7 | |
| 15 | 0.1 | 50 | 1.0 | Galvanized | 14 | 3.2 | |

TABLE 3

| Run No. | Aluminum-clad steel sheet | | | Steel sheet | Welding current (kA) | Tensile shear strength (kN) (average of n = 2) | Classification |
|---|---|---|---|---|---|---|---|
| | Height of protrusion (mm) | Percentage area (%) | Pitch (mm) | | | | |
| 16 | 0.1 | 20 | 1.0 | Galvanized | 8 | 1.3 | Ex. of inv. |
| 17 | 0.1 | 20 | 1.0 | Galvanized | 11 | 2.9 | |
| 18 | 0.1 | 20 | 1.0 | Galvanized | 14 | 3.5 | |
| 13 | 0.1 | 50 | 1.0 | Galvanized | 8 | 1.4 | |
| 14 | 0.1 | 50 | 1.0 | Galvanized | 11 | 2.7 | |
| 15 | 0.1 | 50 | 1.0 | Galvanized | 14 | 3.2 | |
| 19 | 0.1 | 85 | 1.0 | Galvanized | 8 | 1.3 | |
| 20 | 0.1 | 85 | 1.0 | Galvanized | 11 | 2.7 | |
| 21 | 0.1 | 85 | 1.0 | Galvanized | 14 | 3.1 | |

TABLE 4

| Run No. | Aluminum-clad steel sheet | | | Steel sheet | Welding current (kA) | Tensile shear strength (kN) (average of n = 2) | Classification |
|---|---|---|---|---|---|---|---|
| | Height of protrusion (mm) | Percentage area (%) | Pitch (mm) | | | | |
| 22 | 0.1 | 50 | 0.7 | Galvanized | 8 | 1.3 | Ex. of inv. |
| 23 | 0.1 | 50 | 0.7 | Galvanized | 11 | 2.7 | |
| 24 | 0.1 | 50 | 0.7 | Galvanized | 14 | 2.9 | |
| 13 | 0.1 | 50 | 1.0 | Galvanized | 8 | 1.4 | |
| 14 | 0.1 | 50 | 1.0 | Galvanized | 11 | 2.7 | |
| 15 | 0.1 | 50 | 1.0 | Galvanized | 14 | 3.2 | |

TABLE 4-continued

| | Aluminum-clad steel sheet | | | | | Tensile | |
|---|---|---|---|---|---|---|---|
| Run No. | Height of protrusion (mm) | Percentage area (%) | Pitch (mm) | Steel sheet | Welding current (kA) | shear strength (kN) (average of n = 2) | Classification |
| 25 | 0.1 | 50 | 2.0 | Galvanized | 8 | 1.4 | |
| 26 | 0.1 | 50 | 2.0 | Galvanized | 11 | 2.8 | |
| 27 | 0.1 | 50 | 2.0 | Galvanized | 14 | 3.3 | |
| 28 | 0.1 | 50 | 3.0 | Galvanized | 8 | 1.3 | |
| 29 | 0.1 | 50 | 3.0 | Galvanized | 11 | (2.7)(1.9) | |
| 30 | 0.1 | 50 | 3.0 | Galvanized | 14 | 3.2 | |

Runs No. 1 to 3 and Runs No. 4 to 6 show comparison data for the resistance welding method of the present invention. In these runs, welding was carried out using a steel sheet of the present example not having a plating 5 for Runs No. 1 to 3 and using a steel sheet having a plating 5 in combination with an aluminum-clad steel sheet 7 not having a protrusion 10 for Runs No. 4 to 6.

The comparison reveals that, as compared with the weld in the case of the non-plated steel sheet, the weld in the case of the plated steel sheet has lower tensile shear strength on the whole, and this tendency is significant particularly under low welding current conditions at a low currency density.

Tables 2 to 4 show the results of experiments on resistance welding with the height of the protrusion 10, the percentage area of the protrusion 10 in the aluminum-clad steel sheet 7, and the pitch of the protrusion 10 being varied as a parameter. In all the cases, the provision of the protrusion 10 offered better results than the case where no protrusion was provided.

The results will now be reviewed in more detail. From Nos. 7 to 9, Nos. 10 to 12, and Nos. 13 to 15 given in Table 2, it is apparent that, for the height of the protrusion 10, the results are better with increasing height of the protrusion 10 when the height of the protrusion 10 is not more than 1.0 mm. It is considered that, in this height range of the protrusion, a larger height provides a higher capability of the protrusion to accommodate the melted plating 11, which can advantageously improve the quality of the weld. For the above reason, in the resistance welding used in the present example, good results can be obtained when the height of the protrusion 10 is in the range of from about 0.05 to 1.0 mm.

In the case of a thin steel sheet, however, the height of the protrusion may be not more than 0.05 mm with the height being preferably 0.02 to 1.0 mm, still preferably 0.05 to 0.5 mm.

Further, from Nos. 16 to 18, Nos. 13 to 15, and Nos. 19 to 21 given in Table 3, it is apparent that, for the percentage area of the protrusion 10, good quality of the weld can be ensured in any percentage area ranging from about 20 to 85%. However, when the percentage area of the protrusion 10 is very low, the load applied during the resistance welding process deforms the protrusion 10. On the other hand, when it is very high, the capability of the protrusions to accommodate the melted plating 11 is lowered, making it impossible to attain the effect of preventing the current-carrying area from increasing. For this reason, the percentage area is considered to be suitably in the range of from about 10 to 90%.

In Table 4, Nos. 22 to 24, Nos. 13 to 15, No. 25 to 27, and Nos. 28 to 30 demonstrate that good results can be obtained independently of the pitch of the protrusion under conditions used in the present example and that, for the diameter of the electrodes 1, 2 used in the present example, the upper limit of the pitch of the protrusion is about 3.0 mm.

Specifically, in Table 4, two numeral values within the parentheses in No. 29 are those which have been expressed without averaging the data in a number of repetition of 1 (n=1). One of the numerical values, 2.7 kN, compares favorably with the results obtained under other conditions. However, the other strength 1.9 kN is much lower than the results obtained under other conditions.

This is considered to derive from the fact that, since the front end of the electrodes 1, 2 has a semi-spherical shape of 6 mm in diameter, the position where the welding is carried out was between the protrusions, making it difficult for the current to flow intensively through particular protrusion 10. For this reason, in the resistance welding used in the present example, the protrusions are preferably provided at a pitch of not more than 3.0 mm by taking into consideration the relationship with the dimension of the electrodes 1, 2.

Figure 4:
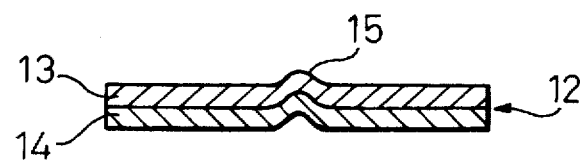
FIG. 4 is a diagram illustrating an additional effect of the resistance welding method of Example 1.

The weldability of a steel sheet can be improved by providing projections in the material to be welded in the step of pressing for the purpose of focusing the current flow. If this technique is applied to the resistance welding of a plated steel sheet, the provision of a projection 15 in an aluminum-clad steel sheet 12 as shown in FIG. 4 is considered. In this case, however, welding should be carried out while catching the projection 15 in such a state that the aluminum-clad steel sheet 12 is sandwiched between the plated steel sheet 4 and the aluminum sheet 6, which deteriorates the workability.

By contrast, according to the resistance welding used in the present example, the current can be properly focused in the abutment of the electrodes 1, 2 in any region where the aluminum-clad steel sheet 4 exists, resulting in the realization of resistance welding having good workability.

Figure 5:
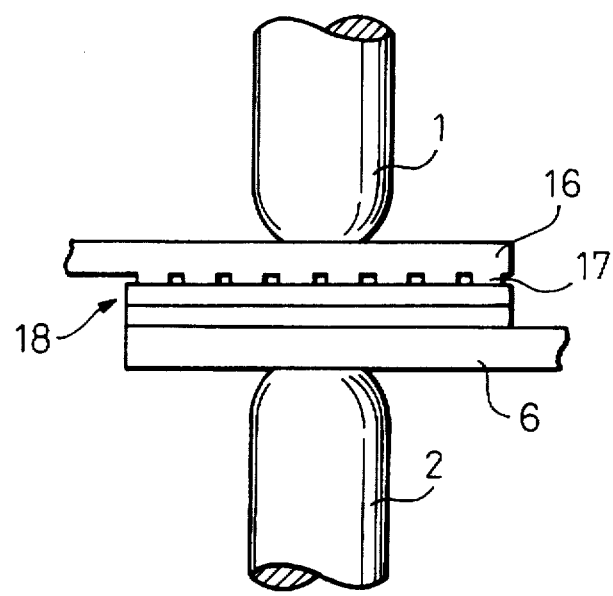
FIG. 5 is a conceptual view illustrating another example of the resistance welding method according to the present invention.
Figure 6:
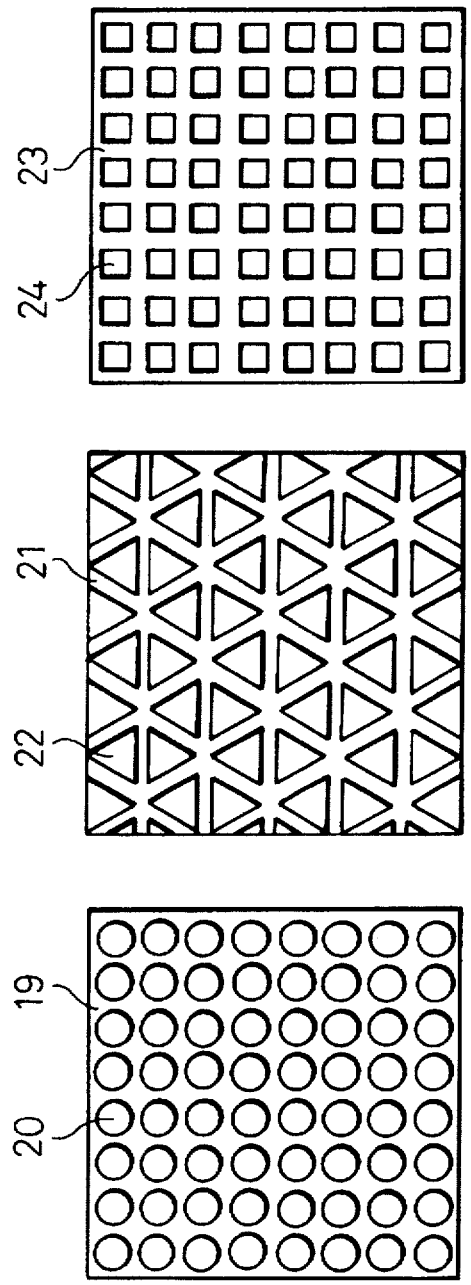
FIGS. 6(A) to 6(C) are diagrams showing other constructions of an aluminum-clad steel sheet suitable for the resistance welding method of Example 1.

In the above example, the prevention of an increase in a current-carrying path created between the plated steel sheet 4 and the aluminum-clad steel sheet 7 is realized by providing protrusions 10 on the aluminum-clad steel sheet 7. The present invention is not limited to this construction only, and any construction may be adopted so far as an increase in current-carrying area can be prevented. For example, it is also possible to use an embodiment as shown in FIG. 5 where protrusions 17 are formed in a plated steel sheet 16 and a flat aluminum-clad steel sheet 18 is used. However, the provision of projections in the aluminum-clad steel sheet is convenient and cost-effective and, hence, advantageous. The aluminum-clad steel sheet 7 shown in FIG. 2 has protrusions 10 in a square pillar form. The function of the projections 10 is to reduce the contact area between the plated steel sheet 4 and the aluminum-clad steel sheet 7, and the shape of the protrusion is not particularly limited so far as the protrusion performs the above function. The same effect can be attained using, for example, an aluminum-clad steel sheet 19 having cylindrical protrusions 20 as shown in FIG. 6(A), an aluminum-clad steel sheet 21 having trigonal prismatic protrusions 22 as shown in FIG. 6(B), or an aluminum-clad steel sheet 23 having square pillar recesses 24 as shown in FIG. 6(C).

The protrusions may be columnar or in such a form that the sectional area is reduced toward the front end. The recesses may be columnar or in such a form that the sectional area of the recess is reduced toward the bottom of the recess.

Protrusions or recesses 10, 17, 20, 22, 24 may be formed in the aluminum-clad steel sheets 7, 19, 21, 23, the plated steel sheet 16, and the like may be formed by a method wherein a relief pattern is compression-formed on a steel layer of an aluminum-clad steel sheet or plated steel sheet having no relief pattern, for example, by a pressure roll or a method wherein a groove is formed by machining, etching, laser beam machining, or the like.

Figure 7:
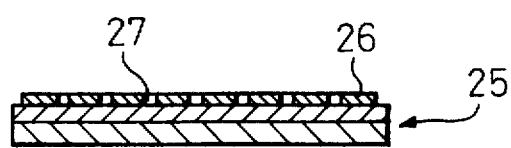
FIG. 7 is a diagram showing a further construction of an aluminum-clad steel sheet suitable for the resistance welding method of Example 1.

Further, it is also possible to use a method as shown in FIG. 7 wherein a thin steel sheet 26 in a net form having an opening 27 is pressure-jointed to an aluminum-clad steel sheet 25 (or a plated steel sheet 4) having no relief pattern or wherein, prior to resistance welding, a thin steel sheet is interposed between the aluminum-clad steel sheet 25 and the plated steel sheet 4. In this method, there is no need of forming a relief in the aluminum-clad steel sheet 25 and the plated steel sheet 4, enabling the resistance welding in the present example to be very easily carried out.

Figure 8:
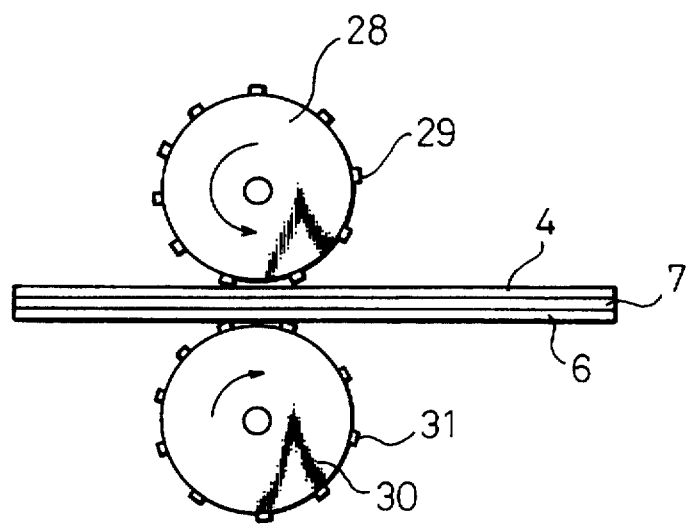
FIG. 8 is a diagram showing an application example of the resistance welding method of Example 1.

Although the above example demonstrates the application of the resistance welding method of the present invention to spot welding, the scope of application of the resistance welding method of the present invention is not limited to spot welding. Specifically, the resistance welding method of the present invention can be applied also to, for example, roll spot welding as shown in FIG. 8 wherein a pair of rolls 28 and 30 having corresponding plurality of projections 29 and 31 are used to carry out spot welding in a continuous manner, or seam welding wherein materials to be welded are sandwiched between a pair of rolls not having any protrusion.

Example 2

Figure 9:
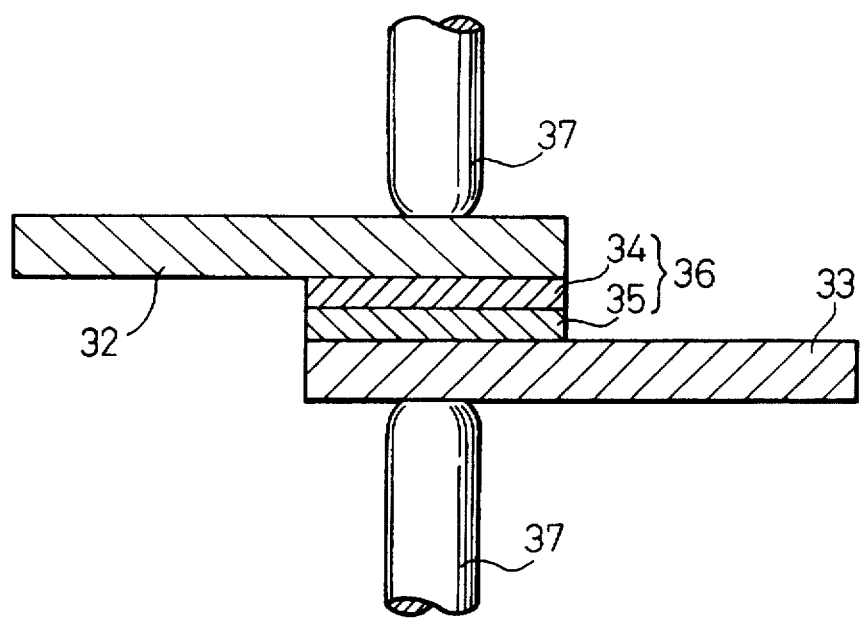
FIG. 9 is a conceptual view illustrating a resistance welding method of Examples 2 and 3 of the present invention.

FIG. 9 is a schematic cross-sectional view illustrating another embodiment of the present invention.

Figure 11A:
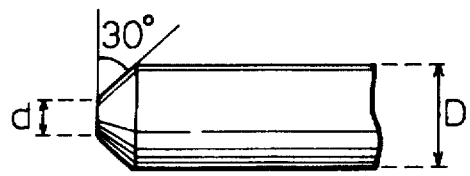
FIG. 11(A) is a diagram showing the shape of a CF-type electrode.
Figure 11B:
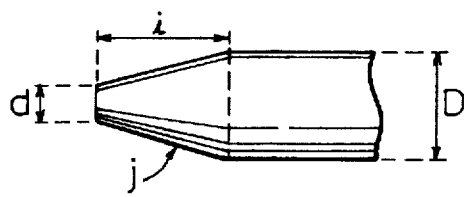
FIG. 11(B) is a diagram showing the shape of a P-type electrode.

As shown in FIG. 9, a galvanized steel sheet 32 (double side plated steel sheet, coverage: 60/60 g/m²) having a size of 30×60×0.80 mm was placed on a steel layer in an aluminum-clad steel sheet 36, having a size of 30×30×0.97 mm, of a 0.67 mm-thick cold-rolled steel sheet 34 and a 0.30 mm-thick aluminum sheet 35 (A1050) (an aluminum-clad steel sheet A; sheet thickness ratio of aluminum sheet to steel sheet=1:2.2), and an aluminum sheet 33 (A5052) having a size of 30×60×1.00 mm was placed on an aluminum layer in the aluminum-clad steel sheet 36. In this state, spot welding was carried out using an a.c. welder under conditions (Nos. 31 to 34) specified in Table 5. The welding load was 1.96 kN, and the welding time was 200 ms (10 cycles). A DR-type electrode (FIG. 11(E), d=6 mm, R=40 mm) was used as the welding electrode for both the plated steel sheet side and the aluminum sheet side. For comparison, spot welding was carried out in the same manner as described above, except that conditions (Nos. 35 to 38) were as specified in Table 5 and an aluminum-clad steel sheet 36, having a size of 30×30×0.79 mm, of a 0.39 mm-thick cold-rolled steel sheet 34 and a 0.40 mm-thick aluminum sheet 35 (A1050) (an aluminum-clad steel sheet B; sheet thickness ratio of aluminum sheet to steel sheet=1:1) was used as the insert material instead of the aluminum-clad steel sheet A.

TABLE 5

| Run No. | Shape of electrode | | Type of aluminum-clad steel | Welding current (kA) | Nugget diameter (mm) | | Tensile shear strength (kN) | Amount of aluminum deposited | Amount of plating deposited | Classification |
|---|---|---|---|---|---|---|---|---|---|---|
| | On iron side | On aluminum side | | | On iron side | On aluminum side | | | | |
| 31 | DR-40R6Φ | DR-40R6Φ | A | 8.5 | 2.0 | 4.9 | 1.57 | Small | Small | Ex. of inv. |
| 32 | " | " | " | 11.0 | 4.2 | 6.4 | 3.21 | Small | Small | |
| 33 | " | " | " | 13.5 | 5.0 | 7.5 | 3.50 | Medium | Medium | |
| 34 | " | " | " | 16.0 | 6.6 | 8.5 | 3.91 | Large | Large | |
| 35 | " | " | B | 8.5 | 0 | 3.5 | 0 | Small | Small | Comp. Ex. |
| 36 | " | " | " | 11.0 | 0 | 6.1 | 1.56 | Small | Small | |
| 37 | " | " | " | 13.5 | 4.0 | 6.7 | 2.87 | Medium | Medium | |
| 38 | " | " | " | 16.0 | 4.9 | 7.5 | 3.52 | Large | Large | |
| 39 | " | R-100R | A | 8.5 | 1.6 | 4.6 | 1.75 | Small | Small | Ex. of inv. |
| 40 | " | " | " | 11.0 | 4.1 | 6.3 | 3.07 | Small | Small | |
| 41 | " | " | " | 13.5 | 5.6 | 8.3 | 3.65 | Medium | Medium | |
| 42 | " | " | " | 16.0 | 6.7 | 8.4 | 3.85 | Large | Large | |

Welding load: 1.96 kN
Welding time: 200 ms

The nugget diameter on the plated steel sheet side, the nugget diameter on the aluminum sheet side, the tensile shear strength, and the amounts of aluminum and plating deposited on the electrodes are given in Table 5. For all the runs, the failure in the tensile shear test occurred on the side of the aluminum sheet.

As compared with the use of the aluminum-clad steel sheet B, the use of the aluminum-clad steel sheet A resulted in lowered current value, at which a nugget was formed on the plated steel sheet side, and the formation of a large nugget at a low current value on both the plated steel sheet side and the aluminum sheet side which in turn resulted in large tensile shear strength. That is, the use of the aluminum-clad steel sheet A provided higher joint strength at a wider range of current values than the use of the aluminum-clad steel sheet B.

Further, when an aluminum-clad steel sheet B was used, a high current value was necessary to provide high strength, which led to increased amount of aluminum and plating deposited. By contrast, when the aluminum-clad steel sheet A was used, the current value required for providing the same strength as in the case of the aluminum-clad steel sheet B was low, making it possible to carry out welding at such a current range as would cause only a small amount of deposition of aluminum and plating.

In other words, it became possible to ensure high joint strength while minimizing the amount of aluminum and plating deposited.

In Run Nos. 31 to 34 (examples of the present invention), a joint of plated steel sheet/aluminum-clad steel sheet/ aluminum sheet was prepared by spot welding using as the insert material, instead of the aluminum-clad steel sheet A, an aluminum-clad steel sheet, having a size of 30×30×1.50 mm, of a 1.00 mm-thick cold-rolled steel sheet and a 0.50 mm-thick aluminum sheet (A1050) (an aluminum-clad steel sheet C; sheet thickness ratio of aluminum sheet to steel sheet=1:3.0) under conditions capable of providing the same tensile shear strength as that in the case of the aluminum-clad steel sheet A. The joints thus obtained were evaluated for tensile shear fatigue properties with varied loads under a loading rate of 10 Hz and a stress ratio of 0.02, and an L-N curve was prepared based on the data.

As a result, comparison of the fatigue strength at $1\times10^6$ cycles has revealed that the fatigue strength of the joint using the aluminum-clad steel sheet A as the insert material was only about 20% lower than that of the joint prepared by welding between aluminum sheets, whereas the fatigue strength of the joint using the aluminum-clad steel sheet C as the insert material was 50% lower than that of the joint prepared by welding between aluminum sheets. This fatigue strength of the joint using the aluminum-clad steel sheet C is very low, rendering this joint unsuitable for practical use.

Example 3

Figure 11C:
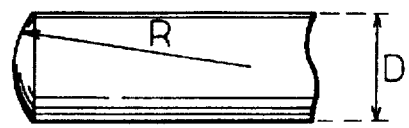
FIG. 11(C) is a diagram showing the shape of an R-type electrode.

A galvanized steel sheet 32 (double side plated steel sheet, coverage: 60/60 g/m$^2$) having a size of 30×60×0.80 mm was placed on a steel layer in an aluminum-clad steel sheet A, and an aluminum sheet (A5052) 33 having a size of 30×60× 1.00 mm was placed on an aluminum sheet in the aluminum-clad steel sheet A, and spot welding was carried out in the same manner as in Example 2, except that an R-type electrode of 100 mm radius of curvature of the curved face of the front end, R, (FIG. 11(C), R=100 mm) was used on the aluminum sheet side. The results are given in Table 5 (Nos. 39 to 42).

Also when the R-type electrode was used on the aluminum sheet side, as compared with the use of the aluminum-clad steel sheet B, the use of the aluminum-clad steel sheet A resulted in lowered current value, at which a nugget was formed on the plated steel sheet side, and the formation of a large nugget at a low current value which in turn resulted in large tensile shear strength.

That is, the use of the aluminum-clad steel sheet A provided higher joint strength at a wider range of current values than the use of the aluminum-clad steel sheet B.

Further, when the R-type electrode was used on the aluminum sheet side, the current value at which expulsion (causative of the dispersion of joint strength or lowering in strength) occurs on the aluminum sheet side was at least 4.0 kA higher than that in the case where the DR-type electrode was used on both the plated steel sheet side and the aluminum sheet side.

Figure 11D:
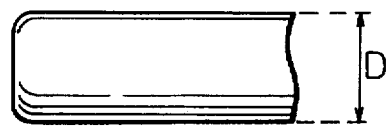
FIG. 11(D) is a diagram showing the shape of an F-type electrode.
Figure 11E:
FIG. 11(E) is a diagram showing the shape of a DR-type electrode.

The same effect could be attained also when an F-type electrode having a diameter of 16 mm (FIG. 11(D), D=16 mm) was used on the aluminum sheet side. In Runs No. 39 to 42 (examples of the present invention), an L-N curve was prepared in the same manner as in Example 2, except that the aluminum-clad steel sheet C was used as the insert material instead of the aluminum-clad steel sheet A. The results were the same as those in Example 2.

Example 4

Figure 10A:
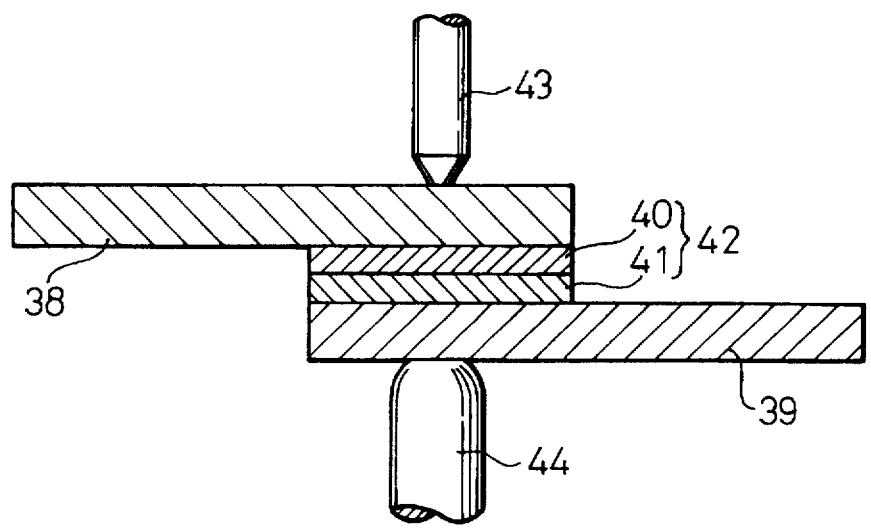
FIGS. 10(A) and 10(B) are conceptual views illustrating resistance welding methods of Examples 7 to 8 of the present invention.

As shown in FIG. 10(A), a cold-rolled steel sheet 38 having a size of 30×60×0.80 mm was placed on a steel layer in an aluminum-clad steel sheet (an aluminum-clad steel sheet B) 42, having a size of 30×30×0.79 mm, a 0.39 mm-thick cold-rolled steel sheet 40 and a 0.40 mm-thick aluminum steel sheet 41 (A1050 ), and an aluminum sheet 39 (A5052) having a size of 30×60×1.00 mm was placed on an aluminum layer in the aluminum-clad steel sheet. In this state, spot welding was carried out using a CF-type electrode 43 of 3.6 mm in diameter of the contact face at the front end, d, (FIG. 11(A), d=3.6 mm) on the cold-rolled steel sheet side with an R-type electrode 44 of 100 mm in radius of curvature in the curved face at the front end, R, (FIG. 11(C), R=100 mm) was used on the aluminum sheet side. The results are given in Table 6 (Nos. 43 to 46).

TABLE 6

| | Shape of electrode | | | Nugget diameter (mm) | | Tensile shear strength (kN) | U-tension strength (kN) | Amount of aluminum deposited | Amount of plating deposited | Classification |
|---|---|---|---|---|---|---|---|---|---|---|
| Run No. | On iron side | On aluminum side | Welding current (kA) | On iron side | On aluminum side | | | | | |
| 43 | CF-3.6Φ | R-100R | 8.5 | 5.5 | 5.0 | 2.44 | — | Small | — | Ex. of inv. |
| 44 | " | " | 11.0 | 6.2 | 6.5 | 3.24 | — | Small | — | |
| 45 | " | " | 13.5 | 6.5 | 6.9 | 3.45 | — | Medium | — | |
| 46 | " | " | 16.0 | 6.8 | 7.6 | 3.54 | — | Large | — | |
| 47 | DR-40R6Φ | DR-40R6Φ | 8.5 | 3.6 | 3.6 | 1.46 | — | Small | — | Comp. Ex. |
| 48 | " | " | 11.0 | 5.6 | 5.5 | 2.44 | — | Small | — | |
| 49 | " | " | 13.5 | 6.4 | 6.9 | 3.27 | — | Medium | — | |
| 50 | " | " | 16.0 | 6.6 | 7.0 | 3.38 | — | Large | — | |
| 51 | CF-3.6Φ | R-100R | 8.5 | 2.2 | 4.1 | 2.12 | 1.43 | Small | Small | Ex. of inv. |
| 52 | " | " | 11.0 | 4.6 | 6.2 | 3.30 | 1.54 | Small | Small | |
| 53 | " | " | 13.5 | 5.3 | 7.2 | 3.55 | 1.39 | Medium | Medium | |
| 54 | " | " | 16.0 | 5.5 | 7.7 | 3.46 | 1.12 | Large | Large | |
| 55 | " | " | 8.5 | 1.9 | 3.6 | 2.18 | 1.36 | Small | Small | |
| 56 | " | " | 11.0 | 4.1 | 6.3 | 2.56 | 1.93 | Small | Small | |

TABLE 6-continued

| Run No. | Shape of electrode On iron side | Shape of electrode On aluminum side | Welding current (kA) | Nugget diameter (mm) On iron side | Nugget diameter (mm) On aluminum side | Tensile shear strength (kN) | U-tension strength (kN) | Amount of aluminum deposited | Amount of plating deposited | Classification |
|---|---|---|---|---|---|---|---|---|---|---|
| 57 | " | " | 13.5 | 5.2 | 7.4 | 3.33 | 1.68 | Medium | Medium | |
| 58 | " | " | 16.0 | 5.6 | 7.8 | 3.45 | 1.53 | Large | Large | |
| 59 | DR-40R6Φ | DR-40R6Φ | 8.5 | 0 | 3.5 | 0 | 0 | Small | Small | Comp. Ex. |
| 60 | " | " | 11.0 | 0 | 6.1 | 1.56 | 0 | Small | Small | |
| 61 | " | " | 13.5 | 4.0 | 6.7 | 2.87 | 1.22 | Medium | Medium | |
| 62 | " | " | 16.0 | 4.9 | 7.5 | 3.32 | 1.40 | Large | Large | |
| 63 | F | " | 8.5 | 5.0 | 5.1 | 2.40 | — | Small | — | Ex. of inv. |
| 64 | " | " | 11.0 | 6.1 | 6.0 | 3.15 | — | Small | — | |
| 65 | " | " | 13.5 | 6.4 | 6.9 | 3.42 | — | Medium | — | |
| 66 | " | " | 16.0 | 6.8 | 7.1 | 3.51 | — | Large | — | |
| 67 | " | " | 8.5 | 2.4 | 4.6 | 2.23 | — | Small | Small | |
| 68 | " | " | 11.0 | 4.4 | 5.8 | 3.18 | — | Small | Small | |
| 69 | " | " | 13.5 | 5.3 | 6.8 | 3.35 | — | Medium | Medium | |
| 70 | " | " | 16.0 | 5.5 | 7.0 | 3.42 | — | Large | Large | |

Welding load: 1.96 kN
Welding load: 200 ms

For comparison, welding was carried out in the same manner as described above, except that a DR-type electrode (FIG. 11(E), d=6 mm and R=40 mm) was used on both the steel sheet side and the aluminum sheet side. The results are given in Table 6 (Nos. 47 to 50).

The nugget diameter, the tensile shear strength, and the amount of aluminum deposited on the steel layer side and the aluminum layer side at welding currents indicated are given in Table 6.

As compared with the use of the DR-type electrode on both the steel sheet side and the aluminum sheet side, the use of the CF-type electrode on the steel sheet with the R-type electrode used on the aluminum sheet side provided a larger nugget at a lower current (8.5 kA) and higher tensile shear strength.

Specifically, a combination of a CF-type electrode and an R-type electrode enables high joint strength to be provided in a wider range of current range as compared with a combination of a DR-type electrode and a DR-type electrode. Further, the combination of a DR-type electrode and a DR-type electrode needs high current (13.5 kA) for providing high strength, resulting in increased amount of aluminum deposited. By contrast, the combination of a CF-type electrode and an R-type electrode requires lower current for providing the same strength, enabling welding to be carried out in such a current range as will cause only a small amount of aluminum deposited.

That is, it is possible to ensure the joint strength while minimizing the amount of aluminum deposited. Further, for the combination of a CF-type electrode and an R-type electrode, expulsion occurred on the aluminum sheet side at a weld current of 15.5 kA, whereas when the R-type electrode was replaced with a DR-type electrode to use a combination of a CF-type electrode and a DR-type electrode, the expulsion occurred at 12.5 kA.

From the above results, it can be said that the use of an R-type electrode having a large radius of curvature in the curved face of the front end, R, is effective for preventing the expulsion on the aluminum sheet side. In Run Nos. 43 to 46 (examples of the present invention), a joint of steel sheet/ aluminum-clad steel sheet/aluminum sheet was prepared by spot welding using as an insert material, instead of the aluminum-clad steel sheet B, the aluminum-clad steel sheet C used in Example 2 under conditions capable of providing the same tensile shear strength as that in the case of the aluminum-clad steel sheet B. For these joints thus obtained, an L-N curve was prepared in the same manner as in Example 2.

As a result, comparison of the fatigue strength at $1\times10^6$ cycles has revealed that the fatigue strength of the joint using the aluminum-clad steel sheet B as the insert material was only about 14% lower than that of the joint prepared by welding between aluminum sheets, whereas the fatigue strength of the joint using the aluminum-clad steel sheet C as the insert material was 50% lower than that of the joint prepared by welding between aluminum sheets.

The same effect could be attained also when a P-type electrode was used on the cold rolled steel sheet side.

Example 5

In Example 4, a plated steel sheet (double side plated steel sheet, coverage: 60/60 g/m$^2$) was placed on a steel layer in the aluminum-clad steel sheet B, and an aluminum sheet (A5052) having a size of 30×60×1.00 mm was placed on an aluminum layer in the aluminum-clad steel sheet B. In this state, spot welding was carried out by means of an a.c. welder using a CF-type electrode (FIG. 11(A), d=3.6 mm) of 3.6 mm in diameter of the contact area at the front end on the plated steel sheet side and an R-type electrode (FIG. 11(C), R=100 mm) of 100 mm in radius of the curvature in the curved face of the front end (FIG. 11(C), R=100 mm) or an F-type electrode having a diameter of 16 mm (FIG. 11(D), D=16 mm) on the aluminum sheet side. The results are given in Table 6 (Nos. 51 to 54 and Nos. 55 to 58).

For comparison, welding was carried out in the same manner as described above, except that a DR-type electrode (FIG. 11(E), d=6 mm and R=40 mm) was used on both the steel sheet side and the aluminum sheet side. The results re given in Table 6 (Nos. 59 to 62).

The welding load was 1.96 kN, and the welding time was 200 ms (10 cycles). The nugget diameter, the tensile shear strength, U-tension strength and the amount of aluminum and plating deposited on the steel layer side and the aluminum layer side at welding currents indicated are given in Table 6.

As compared with the use of the DR-type electrode on both the steel sheet side and the aluminum sheet side, the use of the CF-type electrode on the plated sheet side and the R-type or F-type electrode on the aluminum sheet side resulted in lowered current value for forming a nugget, the formation of a larger nugget at a lower current, and higher tensile shear strength for all the runs.

Specifically, a combination of a CF-type electrode and an R-type electrode and a combination of a CF-type electrode and an F-type electrode enabled high joint strength to be provided in a wider range of current range as compared with a combination of a DR-type electrode and a DR-type electrode.

Further, the combination of a DR-type electrode and a DR-type electrode needs high current for providing high joint strength, resulting in increased amount of aluminum and plating deposited. By contrast, the combination of a CF-type electrode and an R-type electrode or a CF-type electrode and an F-type electrode needs lower current for providing the same strength, enabling welding to be carried out in such a current range as will cause only a small amount of aluminum and plating to be deposited.

That is, it is possible to ensure the joint strength while minimizing the amount of aluminum and plating deposited. Further, for the combination of a CF-type electrode and an F-type electrode, the current value at which expulsion occurs was 3.5 kA higher than that for the combination of a CF-type electrode and an R-type electrode, reducing the occurrence of expulsion.

Further, for the combination of a CF-type electrode and an F-type electrode, the deformation of the aluminum sheet at the weld was smaller (smaller in reduction in sheet thickness) than that for the combination of a CF-type electrode and an R-type electrode, resulting in higher U-tension strength. In Run Nos. 51 to 54 and 55 to 58 (examples of the present invention), a joint of plated steel sheet/aluminum-clad steel sheet/aluminum sheet was prepared by spot welding using as the insert material, instead of the aluminum-clad steel sheet B, the aluminum-clad steel sheet C under conditions capable of providing the same tensile shear strength as that in the case of the aluminum-clad steel sheet B. For the joints thus obtained, an L-N curve was prepared in the same manner as in Example 2.

As a result, comparison of the fatigue strength at $1 \times 10^6$ cycles has revealed that the fatigue strength of the joint using the aluminum-clad steel sheet B as the insert material was only about 16% lower than that of the joint prepared by welding between aluminum sheets, whereas the fatigue strength of the joint using the aluminum-clad steel sheet C as the insert material was 47% lower than that of the joint prepared by welding between aluminum sheets.

The same effect could be attained also when a P-type electrode was used instead of the CF-type electrode on the plated sheet side.

Example 6

Figure 10B:
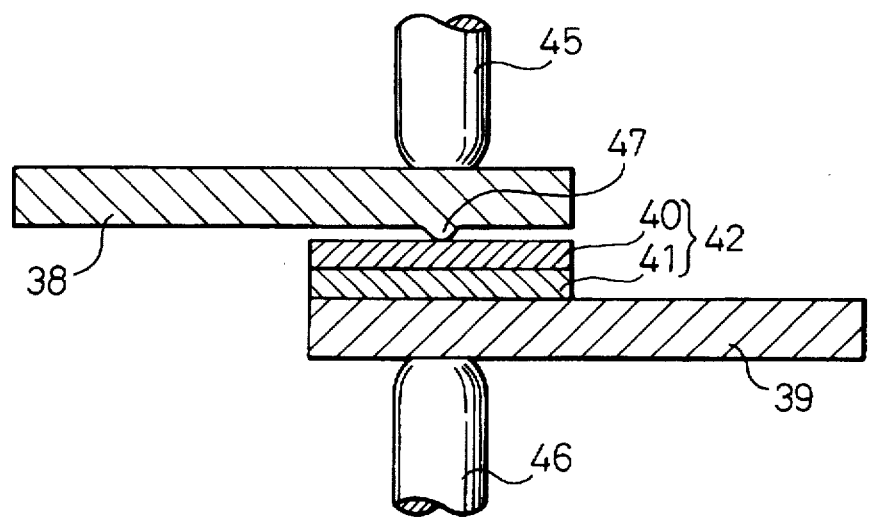

As shown in FIG. 10(B), a steel sheet 38, having a size of 30×60×0.80 mm, provided with a projection 47 having a diameter 2.6 mm and a projection height of 0.8 mm was placed on a steel layer in an aluminum-clad steel sheet (an aluminum-clad steel sheet B) 42, having a size of 30×30× 0.79 mm, of a 0.39 mm-thick cold-rolled steel sheet 40 and a 0.40 mm-thick aluminum steel sheet 41 (A1050 ), and an aluminum sheet 39 (A5052) having a size of 30×60×1.00 mm was placed on an aluminum layer in the aluminum-clad steel sheet. In this state, spot welding was carried out using an F-type electrode 45 having a diameter of 16 mm (FIG. 11(D), D=16 mm) on the steel sheet side and a DR-type electrode 46 (FIG. 11(E), d=6 mm, R=40 mm) on the aluminum sheet side.

The welding load was 0.98 kN and the welding time was 140 ms (7 cycles). The results are given in Table 6 (Nos. 63 to 66).

As compared with the use of the steel sheets not having any projection (Nos. 47 to 50), the use of the steel sheets having a projection resulted in lowered current value for forming a nugget, the formation of a larger nugget at a lower current and higher tensile shear strength for all the runs.

Specifically, the use of the steel sheets having a projection has enabled high joint strength to be provided in a wider range of current range as compared with the use of the steel sheets not having any projection. Further, the steel sheets not having any projection need high current for providing high joint strength, resulting in an increased amount of aluminum deposited. By contrast, the steel sheets having a projection need lower current for providing the same strength, enabling welding to be carried out in such a current range as will cause only a small amount of aluminum to be deposited.

That is, it is possible to ensure the joint strength while minimizing the amount of aluminum deposited. In Runs No. 63 to 66 (examples of the present invention), a joint of plated steel sheet/aluminum-clad steel sheet/aluminum sheet was prepared by spot welding using as the insert material, instead of the aluminum-clad steel sheet B, and the aluminum-clad steel sheet C under conditions was capable of providing the same tensile shear strength as that in the case of the aluminum-clad steel sheet B.

For these joints thus obtained, an L-N curve was prepared in the same manner as in Example 2. As a result, a comparison of the fatigue strength at $1 \times 10^6$ cycles has revealed that the fatigue strength of the joint using the aluminum-clad steel sheet B as the insert material was only about 14% lower than that of the joint prepared by welding between aluminum sheets, whereas the fatigue strength of the joint using the aluminum-clad steel sheet C as the insert material was 50% lower than that of the joint prepared by welding between aluminum sheets.

Example 7

In Example 6, a galvanized steel sheet, having a size of 30×60×0.80 mm, provided with a projection having a diameter 2.6 mm and a projection height of 0.8 mm was placed on a steel layer in the aluminum-clad steel sheet B, and an aluminum sheet (A5052) having a size of 30×60×1.00 mm was placed on an aluminum layer in the aluminum-clad steel sheet B. In this state, spot welding was carried out by means of an a.c. welder using an F-type electrode having a diameter of 16 mm (FIG. 11(D), D=16 mm) on the plated steel sheet side and a DR-type electrode (FIG. 11(E), d=6 mm, R=40 mm) on the aluminum sheet side.

The welding load was 0.98 kN, and the welding time was 140 ms (7 cycles). The results are given in Table 6 (Nos. 67 to 70).

As compared with the use of the plated steel sheets not having any projection (Nos. 59 to 62), the use of the plated steel sheets having a projection resulted in lowered current value for forming a nugget, the formation of a larger nugget at a lower current, and higher tensile shear strength for all the runs.

Specifically, the use of the plated steel sheets having a projection has enabled high joint strength to be provided in a wider range of current range as compared with the use of the plated steel sheets not having any projection. Further, the plated steel sheets not having any projection need high currents for providing high joint strength, resulting in increased amount of aluminum and plating deposited. By contrast, the steel sheets having a projection need lower current for providing the same strength, enabling welding to be carried out in such a current range as will cause only a small amount of aluminum and plating to be deposited.

That is, it has become possible to ensure the joint strength while minimizing the amount of aluminum and plating deposited.

In Runs No. 67 to 70 (examples of the present invention), a joint of plated steel sheet/aluminum-clad steel sheet/aluminum sheet was prepared by spot welding using as the insert material, instead of the aluminum-clad steel sheet B, the aluminum-clad steel sheet C under conditions capable of providing the same tensile shear strength as that in the case of the aluminum-clad steel sheet B. For these joints thus obtained, an L-N curve was prepared in the same manner as in Example 2. As a result, a comparison of the fatigue strength at $1 \times 10^6$ cycles has revealed that the fatigue strength of the joint using the aluminum-clad steel sheet B as the insert material was only about 16% lower than that of the joint prepared by welding between aluminum sheets, whereas the fatigue strength of the joint using the aluminum-clad steel sheet C as the insert material was 50% lower than that of the joint prepared by welding between aluminum sheets.

Example 8

When the steel sheet having a projection of Example 7 was used with an R-type electrode of 100 mm in radius of the curvature in the curved face of the front end, R, (FIG. 11(C), R=100 mm) on the aluminum sheet side, the current value at which expulsion occurs was 2.5 to 3.0 kA higher than that in Example 7. The fatigue strength was the same as that in Example 7.

INDUSTRIAL APPLICABILITY

As described above, according to the present invention, a current can be passed at a high density through between a steel-base metallic sheet or a plated steel sheet and an aluminum-clad steel sheet, enabling positions to be welded by resistance welding to be locally heated with high efficiency. This in turn enables a weld nugget to be suitably grown at a relatively low current, so that stable weld strength can be provided under relatively wide welding conditions.

Further, in the resistance welding, even when plating metal on the surface of the plated steel sheet is melted, the melted plating is accommodated in a recess, preventing an increase in the area of abutment of the plated steel sheet against the aluminum-clad steel sheet. This reduces the current-carrying area to enjoy the above effect.

Furthermore, there is no need of providing any relief in the plated steel sheet and the aluminum-clad steel sheet per se, and a contemplated effect can be attained by merely interposing a steel-base metallic sheet having an opening, enabling a plated steel sheet to be very easily welded to an aluminum-base metallic sheet by resistance welding.

Furthermore, a suitable current-carrying area can be ensured between the plated steel sheet and the aluminum-clad steel sheet independent of the positions of the materials to be welded by resistance welding, enabling a contemplated effect to be attained without need of any high precision of the welding positions.

We claim:

1. A method for resistance welding a plated steel sheet to an aluminum-base metal sheet, comprising the steps of: inserting an aluminum-clad steel sheet comprising a laminate of a steel-base metal sheet and an aluminum-base metal sheet between a plated steel sheet and an aluminum-base metal sheet so that the same types of metals face each other; and subjecting the resultant assembly to resistance welding, characterized in that irregularities are uniformly formed on at least one of the plated steel sheet on the surface to be abutted against the aluminum-clad steel sheet and the aluminum-clad steel sheet on the surface to be abutted against the plated steel sheet to determine a current-carrying area ratio, a melted metal of the plating which is generated by welding heat is accommodated in a recess portion which serves as a non-current carrying portion between the irregularities, so that the current-carrying area ratio is prevented from increasing and an optimum current-carrying area ratio is maintained, and formation of a nugget on the surfaces to be abutted between the steel-base metal layer of the aluminum-clad steel sheet and the plated steel sheet and between the aluminum-base metal layer of the aluminum-clad steel sheet and the aluminum-base metal sheet is accelerated due to the irregularities for determining the current-carrying area ratio.

2. A method for resistance welding a plated steel sheet to an aluminum-base metal sheet according to claim 1, wherein the aluminum-clad steel sheet comprises the laminated steel-base metal sheet and aluminum-base metal sheet, wherein the plated steel sheet and the aluminum-base metal sheet are welded to each other under conditions of a weld current of 7.5 to 15.5 kA and a weld time of 80 to 280 ms, with a thickness ratio of the aluminum-base metal sheet to the steel-base metal sheet in a range of from 1:1.3 to 1:5.0 and having a thickness of 0.2 to 1.2 mm, and said irregularities occupying a predetermined percentage of the surface area are provided on the surface of the steel-base metal sheet side.

3. A method for resistance welding a plated steel sheet to an aluminum-base metal sheet according to claim 1, wherein protrusions of the irregularities occupy a percentage of the surface area of 10 to 90% and have a height of 0.02 to 1.0 mm.

4. A method for resistance welding a plated steel sheet to an aluminum-base metal sheet according to claim 1, wherein protrusions of the irregularities are in a form selected from the group consisting of a circular cylinder, a triangular prism, and a prism and are provided at a pitch of not more than 3 mm.

5. A method for resistance welding a plated steel sheet to an aluminum-base metal sheet according to claim 1, wherein protrusions of the irregularities are formed by a method selected from the group consisting of compression molding, machining, etching, and laser beam machining.

\* \* \* \* \*

UNITED STATES PATENT AND TRADEMARK OFFICE
CERTIFICATE OF CORRECTION

PATENT NO. : 5,783,794
DATED : July 21, 1998
INVENTOR(S) : Hatsuhiko OIKAWA, et al.

It is certified that error appears in the above-indentified patent and that said Letters Patent is hereby corrected as shown below:

Column 2, line 28, change "sheet steel-base" to --sheet: stee-base--.

Column 5, line 39, change "7 to 8" to --4 to 8--.

Column 6, line 63, change "5.0" to --1.5--.

Column 8, line 30, change "2.45 t" to --$2.45 \cdot t$--.

Column 8, line 66, change "5.0" to --1.5--.

Column 20, line 58, change "re" to --are--.

Signed and Sealed this

Twenty-first Day of November, 2000

Attest:

Q. TODD DICKINSON

Attesting Officer      Director of Patents and Trademarks